Patented Nov. 2, 1943

2,333,427

UNITED STATES PATENT OFFICE 2,333,427

STILBENE DYESTUFFS AND A PROCESS FOR MAKING THE SAME

Ernst Keller, Basel, Switzerland, assignor to J. R. Geigy A. G., Basel, Switzerland, a firm No Drawing. Application January 16, 1942, Serial No. 427,061. In Switzerland November 20, 1940

15 Claims. (Cl. 260—143)

In U. S. Patent No. 2,276,202 (application Ser. No. 293,483, filed September 5, 1939) there are described metal containing stilbene azo dyestuffs and their manufacture consisting in condensing in various proportions aminoazo benzene compounds of the general formula

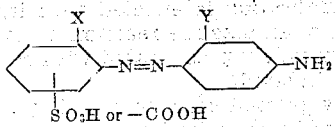

wherein X represents a hydroxyl, alkoxy or carboxyl group or a substituent exchangeable for hydroxyl and Y represents a hydroxyl or alkoxy group or, but not at the same time with X, a substituent exchangeable for hydroxyl, with dinitro stilbene disulfonic acid or dinitro dibenzyl disulfonic acid, if desired together with other amino compounds, and converting the condensation products on the fibre or in substance into metal complex compounds.

It has now been found that similar dyestuffs are obtained by condensing a definite sub-group of aminoazo benzene dyestuffs without sulfonic acid or carboxylic acid groups, alone or simultaneously with other amino compounds which may contain azo groups, especially also together with the aminoazo dyestuffs, described in the U. S. Patent No. 2,276,202 (application Ser No. 293,483), according to the process of this patent, with dinitrostilbene or dinitrodibenzyl disulfonic acid, and treating the condensation products with metal yielding or with oxidising and metal yielding agents.

The sub-group of the aminoazo benzene dyestuffs concerned is defined by the following general formula

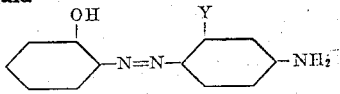

wherein Y represents a hydroxyl or alkoxy group.

Both the benzene nuclei may be further appropriately substituted, excepting sulfonic acid and carboxylic acid groups, the sole condition being that the coupling components can only contain substituents in positions which do not render impossible the formation of the aminoazo benzene dyestuffs.

The aminoazo benzene dyestuffs are produced by usual processes by coupling o-hydroxydiazobenzene compounds with aniline derivatives substituted in the meta-position by a hydroxyl or alkoxy group. As diazo components may be mentioned by way of example: 4-chloro-2-amino-1-hydroxy-benzene, 4-nitro-2-amino-1-hydroxybenzene, 5-nitro-2-amino-1-hydroxybenzene, 6-nitro-2-amino-4-chloro-1-hydroxybenzene, 6-nitro-2-amino-4-methyl-1-hydroxybenzene, 5-nitro-4-chloro-2-amino-1-hydroxybenzene, 3-amino-4-hydroxydiphenyl-sulfone. As coupling components may be mentioned: m-aminophenol, 2-amino-4-hydroxytoluene, m-anisidine, 3-propyloxy- or 3-butoxy-1-aminobenzene, 2:5-dimethoxy or 2:5-diethoxy aniline, 1-amino-2-methyl-5-methoxy-benzene. For the condensation of these aminoazo benzene compounds, as also for the treatment with metal yielding agents all known possibilities of variation come into consideration.

With the new dyestuffs an enlargement of the shade scale of the stilbene dyestuffs is obtained, in addition the dyeings subsequently treated on the fibre with metal yielding agents, especially copper salts, are characterised by a substantially improved very good water fastness.

The present invention is illustrated, but not limited, by the following examples, wherein the parts are by weight unless otherwise stated.

Example 1

29 parts of the dyestuff, made by acetic acid coupling of diazotised 4-nitro-2-amino-1-hydroxybenzene with m-anisidine in the presence of β-salt, are heated to boiling under reflux with 47.4 parts of dinitrostilbene disulfonate of sodium, 900 parts of water and 200 parts of caustic soda lye of 36° Bé. in a stirring boiler for 12–15 hours. After cooling, neutralisation is effected at about 30° C. with hydrochloric acid, the condensation product is completely precipitated with sodium chloride and filtered.

The dyestuff dissolves with a brown color in water, with a blue color in concentrated sulfuric acid and dyes cotton in brown shades, of which the light and water fastness is increased by subsequent treatment with copper salts.

The copper compound of the dyestuff is obtained for example, by dissolving the above dyestuff in 2000 parts of water and 15 parts of 25% ammonia, and allowing at 80–90° C. a solution of 25 parts of crystalline copper sulfate in 100 parts of water and 50 parts of 25% ammonia to flow in and heating for 12 hours to 90-95° C. The metallised compound is isolated in the usual manner by salting out and filtered.

The dried copper complex compound constitutes an almost black powder which dissolves with a red-brown coloration in water, with a blue coloration in concentrated sulfuric acid and dyes cotton in light-fast brown shades.

When in the above example only 23.7 parts instead of 47.4 parts of dinitrostilbene disulfonate of sodium acid are used, a similar dyestuff is obtained, of which the copper complex compound dyes cotton in somewhat more reddish brown shades. Very similar dyestuffs are obtained with other alkoxy-m-aminophenols, such as for instance 3-phenetidine, 3-butoxy-1-aminobenzene and so on.

Example 2

20 parts of the dyestuff from diazotised 4-nitro-2-amino-1-hydroxybenzene and 2:5-dimethoxy-aniline, coupled in acetic acid medium in the presence of β-salt, and 32 parts of the dyestuff sulphanilic acid→cresidine are condensed with 47.4 parts of dinitrostilbene disulfonate of sodium in 500 parts of water and 100 parts of caustic soda lye of 36° Bé. for 18 hours at boiling temperature and the condensation product is isolated in the usual manner.

It is converted into the copper compound as described in Example 1.

When dry the latter constitutes a black powder which dissolves with a yellow-brown color in water, with a violet color in concentrated sulfuric acid and dyes cotton in lightfast brown shades.

A similar dyestuff is obtained when condensation is effected for 6 hours in an autoclave at 120-130° C. 2:5-diethoxy-aniline, instead of 2:5-dimethoxy-aniline, gives very similar dyestuffs.

Example 3

32 parts of the dyestuff 4-nitro-2-amino-1-hydroxybenzene→2:5-dimethoxy-aniline and 30.5 parts of the dyestuff sulphanilic acid→1-amino-2:5-dimethylbenzene are condensed by boiling in the usual manner for 12 to 15 hours with 47.4 parts of dinitrostilbene disulfonate of sodium in 500 parts of water and 100 parts of caustic soda lye of 36° Bé. The condensation product is precipitated in the known manner, filtered and, if necessary, converted into the copper compound.

When dry the latter constitutes a black powder; it dissolves with yellow brown coloration in water, with violet coloration in concentrated sulfuric acid and dyes cotton in light fast khaki shades.

When the dyestuff, before metallising, is dissolved in 800 parts of water and 20 parts of caustic soda lye of 36° Bé. and heated to boiling for one hour with 150 parts of sodium hypochlorite (12% active chlorine), a dyestuff is obtained of which the copper complex compound dyes cotton in somewhat more reddish khaki shades of similar fastness properties.

Example 4

16 parts of the dyestuff, obtained by weakly acid coupling of 4-chloro-2-diazo-1-hydroxybenzene with 2:5-dimethoxy aniline, preferably in the presence of β-salt, and 35 parts of the dyestuff 2-amino-1-hydroxybenzene-4-sulphonic acid → 2:5-dimethoxyaniline or equivalent parts of another dialkoxy-aniline, such as for example 2:5-diethoxy aniline, are condensed at boiling heat for 15 hours with 47.4 parts of dinitrostilbene disulfonate of sodium in 500 parts of water and 100 parts of caustic soda lye of 36° Bé., isolated in the usual manner and, if necessary, converted into the copper compound.

The copper complex compound of the dyestuff when dry constitutes a violet black powder; it dissolves with a blacky red brown coloration in water, with a violet coloration in concentrated sulfuric acid and dyes cellulose fibres in lightfast browny grey shades.

Example 5

29 parts of the dyestuff 4-nitro-2-amino-1-hydroxybenzene → m-anisidine (or m-phenetidine) and 38.5 parts of the copper compound of the dyestuff 2-amino-1-hydroxybenzene-4-sulfonic acid → m-anisidine (or m-phenetidine) are condensed at boiling temperature for 15-18 hours with 47.4 parts of dinitrostilbene disulfonate of sodium in 800 parts of water and 200 parts of caustic soda lye of 36° Bé.; after cooling, neutralisation is effected with hydrochloric acid to a weak alkaline reaction, then the product is completely precipitated with sodium chloride and isolated.

The dry dyestuff constitutes a deep brown powder; it dissolves with red brown coloration in water, with blue coloration in concentrated sulfuric acid and dyes cotton in red brown shades, subsequently treated with copper sulfate in violet brown shades.

Example 6

28 parts of the dyestuff 4-chloro-2-amino-1-hydroxybenzene → m-anisidine and 28 parts of p-aminoazo benzene-p-sulfonic acid are condensed for 15-18 hours at boiling temperature with 47.4 parts of dinitro stilbene disulfonate of sodium, 400 parts of water and 80 parts of caustic soda lye of 36° Bé., isolated in the usual manner and converted into the copper-compound.

The copper compound constitutes a black powder which dissolves in water with brown coloration and in concentrated sulfuric acid with blue coloration and dyes cellulose fibres in full, lightfast brown shades.

In the following Table I are set out further examples of dyestuffs obtainable according to the present invention, whilst there are only given the limiting cases, namely the condensation of one or two molecules of the same aminoazo dyestuff with one molecule of dinitrostilbene disulfonic acid:

Table I

| No. | Aminoazo dyestuff | | Condensation ratio between aminoazo dyestuff and dinitrostilbene disulphonic acid | Shade of the dyeing of the copper complex compound on cotton |
|---|---|---|---|---|
| | Diazo components | Coupling components | | |
| 7 | 4-nitro-2-amino-1-hydroxybenzene | 2-amino-4-hydroxytoluene | 1:1 | Yellow brown. |
| 8 | 4-chloro- or 4-bromo-2-amino-1-hydroxybenzene | m-Aminophenol | 1:1 | Do. |
| 9 | 4-chloro- or 4-bromo-2-amino-1-hydroxybenzene | m-Anisidine | 1:1 | Bluish brown. |
| 10 | do | do | 2:1 | Violet brown. |
| 11 | do | 2:5-dimethoxy-aniline | 1:1 | Dull brown. |
| 12 | do | do | 2:1 | Violet brown. |
| 13 | 4-nitro-2-amino-1-hydroxybenzene | do | 1:1 | Grey brown. |
| 14 | do | do | 2:1 | Do. |
| 15 | 6-nitro-2-amino-4-methyl-1-hydroxybenzene | m-Anisidine | 1:1 | Orange brown. |
| 16 | do | do | 2:1 | Reddish brown. |
| 17 | do | 2:5-dimethoxy-aniline | 1:1 | Red brown. |
| 18 | do | do | 2:1 | Bordeaux brown. |
| 19 | 6-nitro-2-amino-4-chloro-1-hydroxybenzene | m-Anisidine | 1:1 | Brown. |
| 20 | 5-nitro-2-amino-1-hydroxybenzene | do | 1:1 | Do. |

In the following Table II are set out condensation products of 1 molecule of each of two different aminoazo dyestuffs with 1 molecule of dinitrostilbene disulfonic acid. According to the invention the condensation may, however, also be effected in other suitable proportions between at least 1 molecule and at most 2 molecules of aminoazo dyestuff per molecule of dinitrostilbene disulfonic acid.

cules of the known aromatic amino compounds there are used on one molecule of a compound selected from the group consisting of dinitrostilbene disulfonic acid, dinitrodibenzyl disulfonic acid and p-nitrotoluene sulfonic acid together with other amino compounds whose use for this condensation is known, at least one molecule of

*Table II*

| No. | 1. Aminoazo dyestuff | 2. Aminoazo dyestuff | Shade of the dyeing of the copper complex compound on cotton |
|---|---|---|---|
| 21 | 4-chloro-2-amino-1-hydroxybenzene ⟶ m-anisidine. | Sulfanilic acid ⟶ 2:5-dimethyl-1-aminobenzene. | Brown. |
| 22 | do | p-Aminoazobenzene-p'-sulfonic acid. | Full brown. |
| 23 | do | Sulfanilic acid ⟶ 2:5-dimethoxyaniline. | Bordeaux brown. |
| 24 | 4-chloro-2-amino-1-hydroxybenzene ⟶ 2:5-dimethoxyaniline. | Sulfanilic acid ⟶ 1-amino-3-methyl-6-methoxybenzene. | Brown. |
| 25 | do | Sulfanilic acid ⟶ α-naphthylamine. | Reddish brown. |
| 26 | 4-nitro-2-amino-1-hydroxybenzene ⟶ m-anisidine. | p-Aminoazobenzene-p'-sulfonic acid. | Brown. |
| 27 | 4-nitro-2-amino-1-hydroxybenzene ⟶ 2:5-dimethoxyaniline. | Sulfanilic acid ⟶ 2:5-dimethoxyaniline. | Red brown. |
| 28 | do | Dehydrothio-p-toluidine-sulfonic acid. | Khaki. |
| 29 | 3-amino-4-hydroxydiphenyl-sulfone ⟶ 2:5-dimethoxyaniline. | Sulfanilic acid ⟶ 1-amino-3-methyl-6-methoxybenzene. | Brown. |
| 30 | do | Sulfanilic acid ⟶ 2:5-dimethyl-1-aminobenzene. | Grey brown. |
| 31 | 4-chloro-2-amino-1-hydroxybenzene ⟶ 2:5-dimethoxyaniline. | 2-amino-1-hydroxybenzene-4-sulfonic acid ⟶ m-anisidine. | Violetish brown. |
| 32 | 4-nitro-2-amino-1-hydroxybenzene ⟶ 2:5-dimethoxyaniline. | do | Do. |
| 33 | 4-nitro-2-amino-1-hydroxybenzene ⟶ m-anisidine. | 2-amino-1-hydroxybenzene-4-sulfonic acid ⟶ 2:5-dimethoxyaniline. | Do. |
| 34 | 4-nitro-2-amino-1-hydroxybenzene ⟶ 2:5-dimethoxyaniline. | 2-amino-1-hydroxybenzene-4-sulfonic acid ⟶ 2:5-dimethoxyaniline. | Reddish grey. |
| 35 | 4-nitro-2-amino-1-hydroxybenzene ⟶ 2:5-dimethoxyaniline. | 4-chloro-2-amino-1-hydroxybenzene ⟶ 3'-amino-C-phenyl-1:2-N-thiazolo-5-hydroxynaphthalene-7-sulfonic acid. | Brown. |
| 36 | do | 4-nitro-2-amino-1-hydroxybenzene ⟶ 3'-amino-C-phenyl-1:2-N-thiazolo-5-hydroxynaphthalene-7-sulfonic acid. | Do. |
| 37 | 4-nitro-2-amino-1-hydroxybenzene ⟶ m-anisidine. | do | Reddish brown. |

What I claim is:

1. In the manufacture of stilbene dyestuffs by condensation of dinitrostilbene disulfonic acid, dinitrodibenzyl disulfonic acid or p-nitrotoluene sulfonic acid with aromatic compounds, which contain free amino groups, in any desired proportion, in presence of caustic alkalies, with or without the application of pressure, and if desired subsequent treatment of the products with metal yielding and/or oxidising agents, the improvement wherein instead of up to two molecules of the known aromatic amino compounds there are used on one molecule of a compound selected from the group consisting of dinitrostilbene disulfonic acid, dinitrodibenzyl disulfonic acid and p-nitrotoluene sulfonic acid at least one molecule of an aminoazobenzene dyestuff of the formula

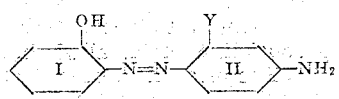

wherein Y means one member of the group consisting of OH and alkoxy, the other substituents of the benzene nucleus I being selected from the group consisting of H, alkyl, halogen, $NO_2$ and $SO_2$.Phe, Phe meaning a phenyl nucleus, the other substituents of the benzene nucleus II being selected from the group consisting of H, alkyl and alkoxy.

2. In the manufacture of stilbene dyestuffs by condensation of dinitrostilbene disulfonic acid, dinitrodibenzyl disulfonic acid or p-nitrotoluene sulfonic acid with aromatic compounds, which contain free amino groups, in any desired proportion, in presence of caustic alkalies, with or without the application of pressure, and if desired subsequent treatment of the products with metal yielding and/or oxidising agents, the improvement wherein instead of up to two molecules of the known aromatic amino compounds there are used on one molecule of a compound selected from the group consisting of dinitrostilbene disulfonic acid, dinitrodibenzyl disulfonic acid and p-nitrotoluene sulfonic acid together with other amino compounds whose use for this condensation is known, at least one molecule of an aminoazo benzene dyestuff of the formula

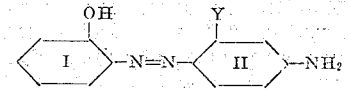

wherein Y means one member of the group consisting of OH and alkoxy, the other substituents of the benzene nucleus I being selected from the group consisting of H, alkyl, halogen, $NO_2$ and $SO_2$.Phe, Phe meaning a phenyl nucleus, the other substituents of the benzene nucleus II being selected from the group consisting of H, alkyl and alkoxy.

3. In the manufacture of stilbene dyestuffs by condensation of dinitrostilbene disulfonic acid, dinitrodibenzyl disulfonic acid, p-nitrotoluene sulfonic acid with aromatic compounds, which contain free amino groups, in any desired proportion, in presence of caustic alkalies, with or without the application of pressure, and if desired subsequent treatment of the products with metal yielding and/or oxidising agents, the improvement wherein instead of the known aromatic amino compounds there are used aminoazobenzene dyestuffs of the formula

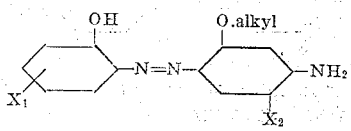

wherein $X_1$ means a substituent selected from the group consisting of H, alkyl, halogen, $NO_2$ and $SO_2$.Phe, Phe meaning a phenyl nucleous, and $X_2$ means a substituent selected from the group consisting of H, alkyl and alkoxy.

4. In the manufacture of stilbene dyestuffs by condensation of dinitrostilbene disulfonic acid, dinitrodibenzyl disulfonic acid or p-nitrotoluene sulfonic acid with aromatic compounds, which contain free amino groups, in any desired proportion, in presence of caustic alkalies, with or without the application of pressure, and if desired subsequent treatment of the products with metal yielding and/or oxidising agents, the improvement wherein instead of the known aromatic amino compounds there is used an aminoazobenzene dyestuff of the formula $$\underset{X_1}{\overset{OH}{\bigcirc}}-N=N-\underset{X_2}{\overset{O.alkyl}{\bigcirc}}-NH_2$$

wherein $X_1$ means a substituent selected from the group consisting of H, alkyl, halogen, $NO_2$ and $SO_2.Phe$, Phe meaning a phenyl nucleus, and $X_2$ means a substituent selected from the group consisting of H, alkyl and alkoxy.

5. In the manufacture of stilbene dyestuffs by condensation of dinitrostilbene disulfonic acid, dinitrodibenzyl disulfonic acid or p-nitrotoluene sulfonic acid with aromatic compounds, which contain free amino groups, in any desired proportion, in presence of caustic alkalies, with or without the application of pressure, and if desired subsequent treatment of the products with metal yielding and/or oxidizing agents, the improvement wherein instead of the known aromatic amino compounds there is used an aminoazobenzene dyestuff of the formula $$\underset{NO_2}{\overset{OH}{\bigcirc}}-N=N-\underset{X}{\overset{O.alkyl}{\bigcirc}}-NH_2$$

wherein X means a substituent selected from the group consisting of H, alkyl and alkoxy.

6. In the manufacture of stilbene dyestuffs, the steps of condensing one molecular proportion of $$\underset{NO_2}{\overset{OH}{\bigcirc}}-N=N-\underset{OCH_3}{\overset{OCH_3}{\bigcirc}}-NH_2$$

and one molecular proportion of $$HO_3S-\bigcirc-N=N-\underset{CH_3}{\overset{O.CH_3}{\bigcirc}}-NH_2$$

with one molecular proportion of dinitrostilbene disulfonic acid and coppering the condensation product.

7. In the manufacture of stilbene dyestuffs, the steps of condensing one molecular proportion of $$\underset{NO_2}{\overset{OH}{\bigcirc}}-N=N-\overset{OCH_3}{\bigcirc}-NH_2$$

and one molecular proportion of the copper compound of the dyestuff $$\underset{SO_3H}{\overset{OH}{\bigcirc}}-N=N-\overset{OCH_3}{\bigcirc}-NH_2$$

with one molecular proportion of dinitrostilbene disulfonic acid.

8. In the manufacture of stilbene dyestuffs, the steps of condensing one molecular proportion of $$\underset{Cl}{\overset{OH}{\bigcirc}}-N=N-\overset{OCH_3}{\bigcirc}-NH_2$$

and one molecular proportion of $$HO_3S-\bigcirc-N=N-\bigcirc-NH_2$$

with one molecular proportion of dinitrostilbene disulfonic acid and coppering the condensation product.

9. The new stilbene dyestuffs from the condensation with dinitrostilbene disulfonic acid of an aminoazobenzene dyestuff $$\overset{OH}{\underset{I}{\bigcirc}}-N=N-\underset{II}{\overset{Y}{\bigcirc}}-NH_2$$

wherein Y means one member of the group consisting of OH and alkoxy, the other substituents of the benzene nucleus I being selected from the group consisting of H, alkyl, halogen, $NO_2$ and $SO_2.Phe$, Phe meaning a phenyl nucleus, the other substituents of the benzene nucleus II being selected from the group consisting of H, alkyl and alkoxy.

10. The new stilbene dyestuffs from the condensation with dinitrostilbene disulfonic acid of at least one amino compound whose use for this condensation is known and of an aminoazobenzene dyestuff $$\overset{OH}{\underset{I}{\bigcirc}}-N=N-\underset{II}{\overset{Y}{\bigcirc}}-NH_2$$

wherein Y means one member of the group consisting of OH and alkoxy, the other substituents of the benzene nucleus I being selected from the group consisting of H, alkyl, halogen, $NO_2$ and $SO_2.Phe$, Phe meaning a phenyl nucleus, the other substituents of the benzene nucleus II being selected from the group consisting of H, alkyl and alkoxy.

11. The new stilbene dyestuffs from the condensation with dinitrostilbene disulfonic acid of an aminoazobenzene dyestuff of the formula $$\underset{X_1}{\overset{OH}{\bigcirc}}-N=N-\underset{X_2}{\overset{O.alkyl}{\bigcirc}}-NH_2$$

wherein $X_1$ means a substituent selected from the group consisting of H, alkyl, halogen, $NO_2$ and $SO_2.Phe$, Phe meaning a phenyl nucleus, and $X_2$ means a substituent selected from the group consisting of H, alkyl and alkoxy, said dyestuff when being coppered having improved water fastness.

12. The new stilbene dyestuffs from the condensation with dinitrostilbene disulfonic acid of an aminoazobenzene dyestuff of the formula $$\underset{NO_2}{\overset{OH}{\bigcirc}}-N=N-\underset{X}{\overset{O.alkyl}{\bigcirc}}-NH_2$$

wherein X means a substituent selected from the group consisting of H, alkyl and alkoxy, said dyestuff when being coppered having improved water fastness.

13. The new stilbene dyestuff from the condensation with one molecular proportion of dinitrostilbene disulfonic acid of one molecular proportion of

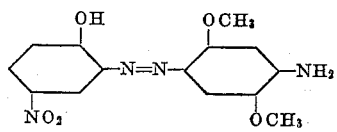

and one molecular proportion of

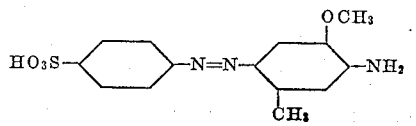

said dyestuff when being coppered having improved water fastness.

14. The new stilbene dyestuff from the condensation with one molecular proportion of dinitrostilbene disulfonic acid of one molecular proportion of

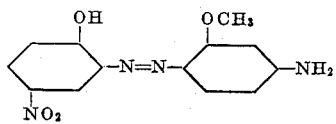

and one molecular proportion of

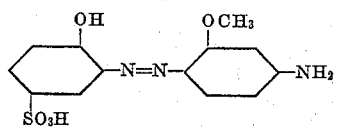

said dyestuff when being coppered having improved water fastness.

15. The new stilbene dyestuff from the condensation with one molecular proportion of dinitrostilbene disulfonic acid of one molecular proportion of

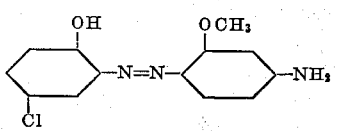

and one molecular proportion of

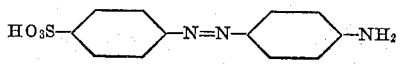

said dyestuff when being coppered having improved water fastness.

ERNST KELLER.